(12) United States Patent
Burgardt

(10) Patent No.: US 9,272,690 B2
(45) Date of Patent: Mar. 1, 2016

(54) PARKING LOCK ARRANGEMENT

(71) Applicant: GETRAG Getriebe- und Zahnradfabrik Hermann Hagenmeyer GmbH & Cie KG, Untergruppenbach (DE)

(72) Inventor: Georg Burgardt, Bretzfeld (DE)

(73) Assignee: GETRAG GETRIEBE-UND ZAHNRADFABRIK HERMANN HAGENMEYER GMBH & CIE KG, Untergruppenbach (DE)

(*) Notice: Subject to any disclaimer, the term of this patent is extended or adjusted under 35 U.S.C. 154(b) by 179 days.

(21) Appl. No.: 13/969,342

(22) Filed: Aug. 16, 2013

(65) Prior Publication Data

US 2014/0060994 A1    Mar. 6, 2014

(30) Foreign Application Priority Data

Sep. 5, 2012 (DE) .......................... 10 2012 017 817

(51) Int. Cl.
*B60T 1/06* (2006.01)
*F16H 63/34* (2006.01)

(52) U.S. Cl.
CPC .............. *B60T 1/06* (2013.01); *F16H 63/3416* (2013.01); *F16H 63/3425* (2013.01); *F16H 63/3466* (2013.01)

(58) Field of Classification Search
CPC ............ F16H 63/3466; F16H 63/3416; F16H 63/3425; F16H 63/3433; F16H 63/3475; F16H 63/3491; B60T 1/06

USPC .................................. 192/219.6, 219.4, 219.5
See application file for complete search history.

(56) References Cited

U.S. PATENT DOCUMENTS

| | | | | |
|---|---|---|---|---|
| 5,704,457 A | * | 1/1998 | Kimura et al. ............. | 192/220.2 |
| 6,725,962 B1 | | 4/2004 | Fukuda | |
| 7,669,686 B1 | | 3/2010 | Einboeck | |
| 2007/0158161 A1 | * | 7/2007 | Fujimoto et al. ........... | 192/219.4 |
| 2009/0193931 A1 | | 8/2009 | Burgardt et al. | |

FOREIGN PATENT DOCUMENTS

| | | |
|---|---|---|
| DE | 20 2008 001 760 U1 | 5/2008 |
| DE | 10 2011 105 068 A1 | 7/2012 |
| EP | 2 275 719 A1 | 1/2011 |

* cited by examiner

*Primary Examiner* — Colby M Hansen
(74) *Attorney, Agent, or Firm* — Knobbe Martens Olson & Bear LLP

(57) ABSTRACT

Parking lock arrangement, having a parking lock mechanism, which can be moved between a parking lock position and a release position, and having an operating device which is supported so that it can rotate about a first axis and which is designed, through rotation, to operate the parking lock mechanism. The parking lock arrangement further has an actuating mechanism and a coupling device which couples the operating device to the actuating mechanism. The actuating mechanism is supported so that it can rotate about a second axis relative to a drum, which is rotatable about the second axis via a drive.

17 Claims, 1 Drawing Sheet

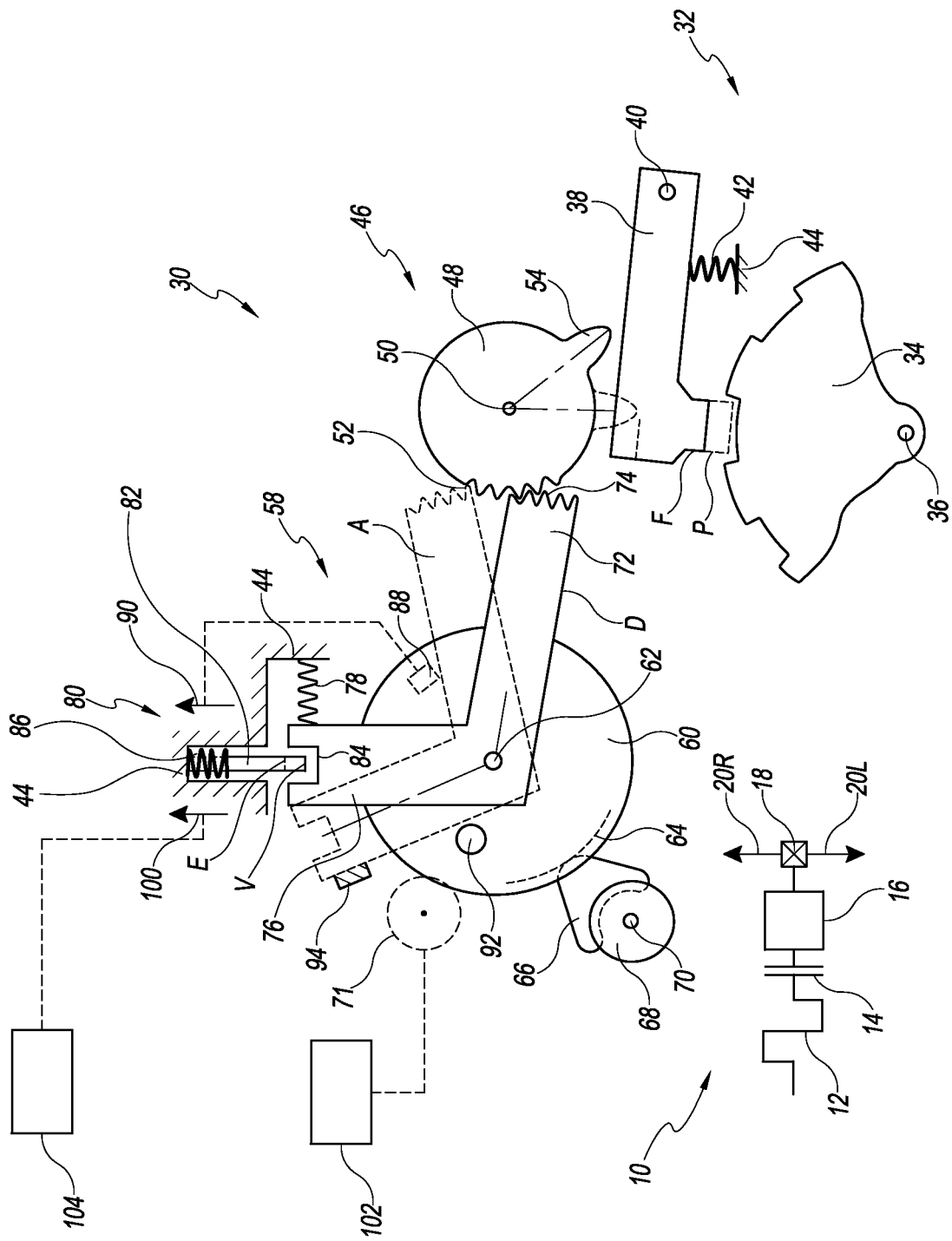

PARKING LOCK ARRANGEMENT

CROSS REFERENCES TO RELATED APPLICATIONS

This application claims priority from German patent application DE 10 2012 017 817.4, filed on Sep. 5, 2012. The entire contents of these priority applications are incorporated herein by reference.

BACKGROUND OF THE INVENTION

The present invention relates to a parking lock arrangement having a parking lock mechanism, which can be moved between a parking lock position and a release position, having an operating device which is supported so that it can rotate about a first axis and which is designed, through rotation, to operate the parking lock mechanism, and having a coupling device which couples the operating device to an actuating mechanism.

DE 20 2008 001 760 U1 (corresponding to US 2009/193931 A1) discloses a comparable parking lock arrangement of this type.

Parking lock arrangements serve to prevent motor vehicles moving and are used, in particular, in motor vehicles having automated drive trains, for example with torque-converter transmissions, dual-clutch transmissions etc.

The parking lock mechanism may comprise a parking lock ratchet, for example, which is rigidly connected to a gearbox output shaft, and a parking lock pawl, which in the parking lock position engages in a toothing of the parking lock ratchet wheel in order thereby to immobilize the vehicle on the output side.

The operating device may be embodied as a wheel or a shaft, on which a cam is provided, which serves to press the parking lock mechanism from a release position into a parking lock position.

As is disclosed in DE 20 2008 001 760 U1, the cam here may be supported on the operating shaft so that it can rotate to a limited extent, the cam being connected to the operating shaft by way of a spring.

This makes it possible to operate the parking lock mechanism also starting from a relative position in which, for example, a projection of a parking lock pawl is aligned with a tooth of a parking lock ratchet wheel.

An actuator or a manual parking lock shift mechanism may be provided for rotating the operating shaft in DE 20 2008 001 760.

SUMMARY OF THE INVENTION

In the light of this, an object of the invention is to specify an improved parking lock arrangement which is of compact construction and/or which readily allows a redundant operation.

According to a first aspect of the present invention this object is achieved by a parking lock arrangement of the aforesaid type, the actuating mechanism being supported so that it can rotate about a second axis relative to a drum, which by means of a drive is rotatable about the second axis.

The fact that the actuating mechanism is rotatable relative to the drum means that the actuating mechanism can be of more compact construction. In particular, a coupling device here can be designed so that, for example, only a small circumferential portion of the actuating mechanism and/or a small peripheral portion of an operating wheel is provided with a toothing. In other words the coupling device can be simplified to a significant degree and in particular can be of more compact construction.

In particular the first axis and the second axis may be formed parallel, it being possible, for example, for the coupling device to be embodied as a belt drive, a chain drive or as a meshing tooth system.

The operating device is preferably an operating wheel, which may be of one or two-part design. In the case of an operating wheel of two-part design, for example, a cam may be designed to rotate relative to the other part of the operating wheel, so that as described in US 2009/193931 A1, a rotation of the operating wheel is possible even when a parking lock pawl is situated above a tooth of a parking lock ratchet wheel and/or the parking lock mechanism is otherwise temporarily locked.

The parking lock mechanism is preferably formed by an arrangement of a parking lock ratchet wheel and a parking lock pawl, the parking lock pawl preferably engaging on the outer circumference of the parking lock ratchet wheel.

The object is therefore achieved in full.

According to an especially preferred embodiment the actuating mechanism is mechanically biased into an activation position, in which the parking lock mechanism can be moved into the parking lock position.

The bias here is preferably towards a housing of the parking lock arrangement, which may be a housing of a gearbox.

In this embodiment the actuating mechanism consequently strives to engage the parking lock position irrespective of the relative rotational position of the shift drum.

According to a further preferred embodiment the parking lock mechanism is mechanically biased into the release position. This bias may also be achieved by a spring, which is braced, for example, on a housing of the parking lock arrangement.

As a result the parking lock mechanism is generally situated in the release position, unless the operating device impinges thereon.

It is especially preferred here if a mechanical bias of the actuating mechanism is greater than a mechanical bias of the parking lock mechanism, so that when no other forces are acting the actuating mechanism is able to move the parking lock mechanism into the parking lock position in opposition to its bias.

In order to keep the actuating mechanism in a deactivation position, a locking device is preferably provided, which serves to lock the actuating mechanism in the deactivation position, it being possible to move the parking lock mechanism into the release position when the actuating mechanism is in the deactivation position.

A mechanical biasing of the parking lock mechanism into the release position consequently allows this mechanism to be held in the release position when the actuating mechanism is locked in the deactivation position by means of the locking device.

In this embodiment the actuating mechanism is therefore generally locked in the deactivation position by means of the locking device, in order, for example, to select a normal driving mode of a motor vehicle. In order to engage the parking lock arrangement (movement into the parking lock position), the locking device is then displaced into a release position, so that the actuating mechanism can move the parking lock arrangement into the parking lock position. If the actuating mechanism is mechanically biased into an activation position, the parking lock arrangement can consequently be shifted into the parking lock position by the mechanical bias as soon as the locking device is in the release position.

It is generally possible here to shift the locking device actively into a locking position and actively into a release position, for which purpose a suitable actuator may be provided.

It is especially preferred, however, if the locking device is mechanically biased in a direction in which the locking device is able to lock the actuating mechanism in the deactivation position.

In this embodiment an active engagement is necessary only in order to shift the locking device into a release position.

It is especially preferred here if the locking device can be moved into a release position by means of the drum, in order to release the actuating mechanism.

Here a suitable release feature, for example a ramp contour or the like, which moves the locking device into the release position as the drum rotates, may be provided on the drum.

According to an alternative or accumulative embodiment the locking device can be moved into the release position by means of an electrical or hydraulic actuator, in order to release the actuating mechanism.

In the alternative embodiment the drum can therefore be made to a simpler design. An electrical actuator, for example in the form of an electromagnetic actuator, for example, is especially preferred here.

Where the locking device can be shifted into the release position both by means of the drum and also by means of the electrical or hydraulic actuator, this affords scope for a redundant release.

If the drum is jammed, for example, the locking device can still be moved into the release position by means of the electrical or hydraulic actuator, so as in this way to shift the parking lock arrangement into the parking lock position (and thereby to immobilize a vehicle should a transmission control or the like fail, for example).

It is especially preferred, particularly when the actuating mechanism is mechanically biased into an activation position, if a catch device, which serves to move the actuating mechanism from the activation position into a deactivation position, is arranged on the drum.

In this embodiment the drum is consequently used to shift the actuating mechanism into the deactivation position, in which the actuating mechanism is then preferably locked by means of a locking device.

The drum may be any rotatable component and may take the form, for example, of a wheel, a shaft or the like.

It is especially preferred, however, if the drum is a shift drum, which is coupled to at least one shifting element, which serves to operate a shifting clutch arrangement.

In this embodiment the shift drum consequently has a dual function; firstly to operate the shifting clutch arrangement, and secondly to operate the parking lock arrangement.

In this embodiment the invention also lies, in particular, in the provision of a gearbox having such a parking lock arrangement, the shift drum being designed to operate at least one shifting clutch arrangement.

The shifting clutch arrangement may serve, in particular, for engaging and disengaging gears of the gearbox arrangement, the gearbox arrangement preferably being a spur-gear drive transmission of countershaft type.

According to a further aspect of the present invention, which may be combined with the aforementioned first aspect in any combination, the aforesaid object is achieved by a parking lock arrangement having a parking lock mechanism, which is assigned to a gearbox and which can be moved between a parking lock position and a release position, the parking lock arrangement further comprising an actuating mechanism, which is coupled to the parking lock mechanism and is mechanically biased into an activation position, in which the parking lock mechanism can be moved into the parking lock position, it being possible by means of a locking device to lock the actuating mechanism in a deactivation position, in which the parking lock mechanism can be moved into the release position, the locking device being mechanically biased into a locking position, in which the locking device is able to lock the actuating mechanism in the deactivation position, the locking device being movable into a release position by means of an electrical shift drive for the operation of a shifting clutch of the gearbox, in order to release the actuating mechanism, and the locking device being redundantly moveable into the release position by means of an electrical or hydraulic actuator, in order to release the actuating mechanism.

In this aspect of the invention a parking lock arrangement is provided, in which a redundant operation of the parking lock arrangement is preferably possible in any operating state of the motor vehicle.

Should the shift drive fail, for example, the locking device can be shifted into the release position by means of the electrical or hydraulic actuator, thereby releasing the actuating mechanism and shifting the parking lock mechanism into the parking lock position due to the mechanical bias.

It is especially preferred here if the electrical shift drive is activated by a transmission control unit, and if the electrical or hydraulic actuator is activated by a vehicle control unit.

In this case, should the transmission control unit fail, the overriding vehicle control unit is capable of shifting the parking lock arrangement into the parking lock position, in order thereby to ensure that even in the event of the transmission control unit failing the parking lock arrangement can be shifted into the parking lock position, in order to immobilize the vehicle.

It will be obvious that the features specified above and those yet to be explained below can be employed not only in the particular combination specified, but also in other combinations or in isolation, without departing from the scope of the present invention.

BRIEF DESCRIPTION OF THE DRAWINGS

Exemplary embodiments of the invention are represented in the drawing and are explained in more detail in the following description. In the drawing:

FIG. 1 shows a schematic view of a drivetrain of a motor vehicle having one embodiment of a parking lock arrangement according to the invention.

DETAILED DESCRIPTION OF PREFERRED EMBODIMENTS

In FIG. 1, a drivetrain for a motor vehicle is represented schematically and denoted generally by 10.

The drivetrain 10 comprises a drive motor 12 such as an internal combustion engine, a hybrid drive unit, an electric motor or the like. The drivetrain 10 further comprises a clutch arrangement 14 and a gearbox arrangement 16. An outlet of the gearbox arrangement 16 is connected to a differential 18, which distributes the propulsive power to powered wheels 20L, 20R. The drivetrain 10 may comprise, in particular, a dual clutch gearbox, in which the clutch arrangement 14 comprises two friction clutches and in which the gearbox arrangement 16 comprises two transmission mechanisms.

The drivetrain 10 comprises a parking lock arrangement 30, which is preferably accommodated inside the gearbox arrangement 16 but may also be accommodated in the differential 18.

The parking lock arrangement 30 serves for immobilizing a motor vehicle, which is equipped with the drivetrain 10, and comprises a parking lock mechanism 32. The parking lock mechanism 32 can prevent a shaft, connected to an output of the motor vehicle, from rotating in that the parking lock mechanism in a parking lock position is braced against a housing or the like.

Here the parking lock mechanism 32 comprises a parking lock ratchet wheel 34, which is fixed to a drivetrain shaft 36 (for example a gearbox output shaft). The parking lock mechanism 32 further comprises a parking lock pawl 38, which is supported so that it can pivot about a pawl axis 40. The pawl axis 40 is a pivot fixed to the housing and is preferably aligned parallel to the drivetrain shaft 36. On its outer circumference the parking lock ratchet wheel 34 has a schematically indicated toothing. In the area of its free end the parking lock pawl 38 has a projection. In a parking lock position P the projection engages in a tooth gap of the parking lock ratchet wheel 34 (represented by dashed lines in FIG. 1), in order thereby to prevent the parking lock ratchet wheel 34 and hence the drivetrain shaft 36 from rotating. To adopt a release position (shown by solid lines in FIG. 1), the parking lock pawl 38 is swiveled so far out of the area of the parking lock ratchet wheel 34 that the projection thereof cannot engage in the toothing of the parking lock ratchet wheel 34, therefore allowing the latter to rotate freely.

The parking lock mechanism 32 is preferably mechanically biased into the release position F. For this purpose a spring 42 is provided, which may be braced, for example, on a housing 44 of the parking lock arrangement 30.

The parking lock arrangement 30 further comprises an operating device 46. The operating device 46 comprises an operating wheel 48, which is supported so that it can rotate about a wheel axis 50, which is preferably aligned parallel to the drivetrain shaft 36. A gear toothing 52 is provided on a circumferential portion of the operating wheel 48; the circumferential portion may be less than or equal to 90°, in particular less than or equal to 45°, in particular less than or equal to 30°, the circumferential range preferably being greater than 5°.

The remaining circumferential portion of the operating wheel 48 need not be toothed and may be of any design, so that the operating wheel 48 may also deviate from a circular shape.

A cam 54 is formed on an outer circumference of the operating wheel 48. In the rotational position of the operating wheel 48 shown in solid lines in FIG. 1 the cam 54 does not act on the parking lock pawl 38. If the operating wheel 48 is rotated through an operating angle in the range from 5° to 90°, however, particularly in the range from 10° to 45°, into a position represented by dashed lines in FIG. 1, the cam 54 presses the parking lock pawl 38 in the direction of the parking lock ratchet 34 in opposition to the bias of the pawl spring 42. The parking lock position P is thereby engaged in the parking lock mechanism 32.

Here the operating wheel 48 may be of two-part design, similar to that described in US 2009/193931 A1, the disclosure of which is here referred to in its entirety. A spring bracing provided between the two operating wheel parts can thereby be used to rotate the operating wheel 48 even when the projection of the parking lock pawl 38 is situated above a tooth of the toothing of the parking lock ratchet wheel 34. As the parking lock ratchet wheel 34 is rotated further, the cam 54 is then carried by means of the bracing in order to press the parking lock pawl 38 into the toothing.

The parking lock arrangement 30 further comprises an actuating mechanism 58.

The actuating mechanism 58 serves to rotate the operating wheel 48 and is assigned to a drum in the form of a shift drum 60. The drum 60 is supported so that it can rotate about a drum axis 62, which is aligned parallel to the wheel axis 50. A shift groove 64, in which a shifting element 66 such as a gearshift fork engages, is formed on the outer circumference of the drum 60. The shifting element 66 acts on a schematically indicated shifting clutch arrangement 68, for example on a gearshift sleeve thereof. The shifting clutch arrangement 68 is supported on a gearbox shaft 70, which is aligned parallel to the drum axis 62.

The actuating mechanism 58 is likewise supported so that it can rotate (preferably to a limited extent) about the drum axis 62. Here the actuating mechanism 58 is also supported so that it can rotate relative to the drum 60. The drum 60 can thereby be rotated over a wide angular range, in order to engage various gears, for example, without this having an influence on the actuating mechanism 58.

Furthermore the actuating mechanism 58 can generally be rotated irrespective of a rotational position of the drum 60, in order to bring the parking lock mechanism 32 into the parking lock position P largely irrespective of the position of the shift drum 60.

The shift drum 60 can be rotated by means of a schematically indicated drum drive 71, which may take the form of an electric motor, for example, which may be arranged eccentrically (as shown) or concentrically with the drum axis 62.

The actuating mechanism 58 comprises a coupling portion 72, which has a coupling toothing 74. The coupling toothing 74 meshes with the gear toothing 52 of the operating wheel 48. The coupling toothing 74 may also extend over a relatively small circumferential portion of the actuating mechanism 58, for example in the range from 3° to 90°, in particular in the range from 5° to 45°, The actuating mechanism 58 further comprises a locking portion 76. The locking portion 76 and the coupling portion 72 may be the ends of a class 2 lever, as represented in FIG. 1. The portions 72, 76 may also be parts of a wheel or the like, however. In FIG. 1 the locking portion 76 extends beyond the radius of the drum 60, but it may also be shorter than the radius.

By means of a biasing spring 78 the actuating mechanism 58 is biased against the housing 44 into an activation position A (represented by dashed lines in FIG. 1). In the activation position A the actuating mechanism 58 is rotated so that the operating wheel 48 is rotated, so as to engage the parking lock position P.

FIG. 1 shows, in solid lines, a deactivation position D of the actuating mechanism 58, in which the actuating mechanism 58 has rotated the operating wheel 48 into a position in which the parking lock pawl 38 can be pressed into the release position F by means of the pawl spring 42.

The actuating mechanism 58 is held in the deactivation position D by means of a locking device 80. The locking device 80 comprises a locking element 82, which is displaceably supported on the housing 44. Here the direction of displacement of the locking element 82 is radially to the drum axis 62. In other embodiments, however, the direction of displacement may also be aligned parallel to the drum axis 62.

A locking depression 84 is formed on the locking portion 76 of the actuating mechanism 58. The locking element 82 is biased by means of a locking spring 86 into a locking position V, in which the locking element 82 engages in the locking depression 84, in order thereby to lock the actuating mechanism 58 in the deactivation position D.

The locking element 82 is displaceable, in opposition to the force of the locking spring 86, into a release position E, in which the locking element 82 does not engage in the locking depression 84. In the release position E of the locking device 80 the actuating mechanism 58 is consequently released, and under the force of the biasing spring 78, which is braced against the housing 44, is rotated in the direction of the activation position A substantially irrespective of the position of the shift drum 60.

The parking lock pawl 38 is thereby shifted into the parking lock position P by the rotation of the operating wheel 48.

As a rule the movement of the locking element 82 into the release position E is accomplished by means of a mechanical release feature 88 on the shift drum 60, via which the locking element 82 is shifted into the release position E when the shift drum 60 is in specific rotational position relative to the actuating mechanism 58. This is only indicated schematically in FIG. 1 (drum release 90).

To transfer the parking lock arrangement 30 from the parking lock position P into the release position F it is necessary to rotate the actuating mechanism 58 from the activation position A into the deactivation position D.

For this purpose a catch device 92 is preferably provided on the shift drum 60, the catch device being designed to carry the actuating mechanism 58 over a limited angular range until the actuating mechanism 58 is again aligned with the locking device 80, in order to then engage the locking position V of the locking element 82 by means of the locking spring 86.

A stop, which may be connected to the housing 44, for example, and which limits the rotation of the actuating mechanism 58 by the biasing spring 78 to a small angular range, which may lie in the range of the aforementioned angular ranges, is shown schematically at 94.

Also represented schematically at 100 in FIG. 1 is an actuator, which may be embodied as an electrical or a hydraulic actuator, preferably as an electromagnetic actuator. The actuator 100 serves for redundant shifting of the locking element 82 into a release position E in opposition to the force of the locking spring 86.

This makes it possible to engage the parking lock arrangement (to transfer it into the parking lock position P) at any time irrespective of the rotational position of the shift drum 60, even when, for example, the shift drum 60 is jammed or cannot be driven, so that the release feature 88 cannot be brought into engagement with the locking element 82.

The drum drive 71 is preferably connected to a transmission control unit 102, which serves to activate the electrical drum drive 71 for rotating the shift drum 60 into various rotational positions, in order to engage or disengage gears, for example, or to operate the parking lock arrangement 30.

Should the transmission control unit 102 fail, the shift drum 60 can therefore no longer be used to transfer the parking lock arrangement 30 into the parking lock position P.

For this reason the actuator 100 is preferably connected to another control unit, in particular a vehicle control unit or an engine control unit 104. This is consequently able, by activating the actuator 100, to initiate a transfer of the parking lock arrangement 30 into the parking lock position P, even if the possibly subordinate transmission control unit 102 has failed.

According to a further preferred embodiment the actuator 100 may also be activated from multiple locations, for example by means of the vehicle control unit 104 or by means of the transmission control unit 102, so that the parking lock arrangement 30 can be transferred into the parking lock position P even when the vehicle control unit 104 has failed and the shift drum 60 is mechanically jammed, for example, but the transmission control unit 102 is functioning.

Owing to its simple construction the parking lock arrangement 30 according to the invention can be produced at low cost and with little complexity. Further advantages are a high degree of integration and great robustness.

Overall, an increased availability of the parking lock arrangement 30 is furthermore ensured. Moreover, a fully integrated solution can be achieved. If a redundant operation of the locking device 80 is not required, the actuator 100 may also be omitted, for example.

Instead of an electromagnetic drive the actuator 100 may also comprise an electric motor with spindle drive.

Furthermore, the parking lock arrangement 30 may also be combined with a conventional parking lock ("bullet design") by way of corresponding deflecting mechanisms.

What is claimed is:

1. Parking lock arrangement, having
a parking lock mechanism, which can be moved between a parking lock position and a release position;
an operating device which is supported so that it can rotate about a first axis and which is designed, through rotation, to operate the parking lock mechanism;
an actuating mechanism which is movable between an activation position and a deactivation position;
a coupling device which couples the operating device to the actuating mechanism;
a locking device; and
a drum which by means of a drive is rotatable about a second axis;
the actuating mechanism being supported so that it can rotate about the second axis relative to the drum and the actuating mechanism being positively lockable by means of the locking device in the deactivation position, in which the parking lock mechanism can be moved into the release position.

2. Parking lock arrangement according to claim 1, wherein the actuating mechanism is mechanically biased into the activation position, in which the parking lock mechanism can be moved into the parking lock position.

3. Parking lock arrangement according to claim 1, wherein the parking lock mechanism is mechanically biased into the release position.

4. Parking lock arrangement according to claim 1, wherein the locking device is mechanically biased into a locking position, in which the locking device is able to lock the actuating mechanism in the deactivation position.

5. Parking lock arrangement according to claim 1, wherein the drum has a mechanical release feature by means of which the locking device can be moved into a release position when the drum is rotated, in order to release the actuating mechanism.

6. Parking lock arrangement according to claim 1, wherein the locking device can be moved into a release position by means of an electrical or hydraulic actuator, in order to release the actuating mechanism.

7. Parking lock arrangement according to claim 1, wherein a catch device, which serves to move the actuating mechanism from the activation position into the deactivation position, is arranged on the drum.

8. Parking lock arrangement according to claim 1, wherein the drum is a shift drum, which is coupled to at least one shifting element, which serves to operate a shifting clutch arrangement.

9. Parking lock arrangement for a gearbox, comprising a parking lock mechanism which can be moved between a parking lock position and a release position, and further comprising an actuating mechanism, which is coupled to the parking lock mechanism and is mechanically biased into an activation position, in which the parking lock mechanism can be moved into the parking lock position, it being possible by means of a locking device to lock the actuating mechanism in a deactivation position, in which the parking lock mechanism can be moved into the release position, the locking device being mechanically biased into a locking position, in which the locking device is able to positively lock the actuating mechanism in the deactivation position, the locking device being movable into a release position by means of an electrical shift drive for the operation of a shifting clutch of the gearbox, in order to release the actuating mechanism, and the locking device being redundantly moveable into the release position by means of an electrical or hydraulic actuator, in order to release the actuating mechanism.

10. Parking lock arrangement according to claim 9, wherein the electrical shift drive is activated by a transmission control unit, the electrical or hydraulic actuator being activated by a vehicle control unit.

11. Parking lock arrangement, having a parking lock mechanism, which can be moved between a parking lock position and a release position, and having
- an operating device which is supported so that it can rotate about a first axis and which is designed, through rotation, to operate the parking lock mechanism;
- an actuating mechanism;
- a coupling device which couples the operating device to the actuating mechanism; and
- a drum which by means of a drive is rotatable about a second axis;

the actuating mechanism being supported so that it can rotate about the second axis relative to the drum wherein the parking lock mechanism is mechanically biased into the release position; and wherein the actuating mechanism can be positively locked by means of a locking device in a deactivation position, in which the parking lock mechanism can be moved into the release position.

12. Parking lock arrangement according to claim 11, wherein the actuating mechanism is mechanically biased into an activation position, in which the parking lock mechanism can be moved into the parking lock position.

13. Parking lock arrangement according to claim 11, wherein the locking device is mechanically biased into a locking position, in which the locking device is able to lock the actuating mechanism in the deactivation position.

14. Parking lock arrangement according to claim 11, wherein the locking device can be moved by means of the drum into a release position, in order to release the actuating mechanism.

15. Parking lock arrangement according to claim 11, wherein the locking device can be moved into a release position by means of an electrical or hydraulic actuator, in order to release the actuating mechanism.

16. Parking lock arrangement according to claim 11, wherein a catch device, which serves to move the actuating mechanism from an activation position into the deactivation position, is arranged on the drum.

17. Parking lock arrangement according to claim 11, wherein the drum is a shift drum, which is coupled to at least one shifting element, which serves to operate a shifting clutch arrangement.

* * * * *